US012238039B2

(12) United States Patent
Wang et al.

(10) Patent No.: US 12,238,039 B2
(45) Date of Patent: Feb. 25, 2025

(54) TRANSPORT BLOCK DESCRIPTOR FOR PACKET GROUPING

(71) Applicant: QUALCOMM Incorporated, San Diego, CA (US)

(72) Inventors: Lulu Wang, San Diego, CA (US); Xing Chen, San Diego, CA (US); Ashwin Raman, San Diego, CA (US); Pavan Suresh Dhareshwar, San Diego, CA (US); Carlos Jesus Romanillos, Santee, CA (US); Vignesh Nagarajan, San Diego, CA (US); Kaiyuan Fan, San Diego, CA (US); Akhil Agrawal, San Diego, CA (US); Sivaram Srivenkata Palakodety, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/645,891

(22) Filed: Dec. 23, 2021

(65) Prior Publication Data

US 2023/0208601 A1 Jun. 29, 2023

(51) Int. Cl.
*H04L 5/00* (2006.01)
*H04W 28/02* (2009.01)

(52) U.S. Cl.
CPC ....... *H04L 5/0058* (2013.01); *H04W 28/0205* (2013.01)

(58) Field of Classification Search
None
See application file for complete search history.

(56) References Cited

U.S. PATENT DOCUMENTS

| 2009/0141670 | A1* | 6/2009 | Duncan Ho | ........ | H04W 28/065 |
| | | | | | 370/328 |
| 2020/0008234 | A1* | 1/2020 | Li | ........ | H04W 72/044 |
| 2021/0021321 | A1* | 1/2021 | Liu | ........ | H04B 7/088 |
| 2023/0059650 | A1* | 2/2023 | Deshmukh | ........ | H04L 69/22 |

* cited by examiner

*Primary Examiner* — Jason E Mattis
*Assistant Examiner* — Bao G Nguyen
(74) *Attorney, Agent, or Firm* — Harrity & Harrity, LLP

(57) ABSTRACT

Various aspects of the present disclosure generally relate to wireless communication. In some aspects, a transmitter network node may generate a grouping descriptor, for a transport block, that indicates grouping information for a plurality of protocol data units (PDUs) in the transport block. The transmitter network node may transmit the grouping descriptor with the transport block. Numerous other aspects are described.

30 Claims, 11 Drawing Sheets

TRANSPORT BLOCK DESCRIPTOR FOR PACKET GROUPING

FIELD OF THE DISCLOSURE

Aspects of the present disclosure generally relate to wireless communication and to techniques and apparatuses for transport block descriptor for packet grouping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station. As described in more detail below, the base station may be implemented as a transmitter network node or as a receiver network node. Similarly, the UE may be implemented as a transmitter network node or as a receiver network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter network node. The method may include generating a grouping descriptor, for a transport block, that indicates grouping information for a plurality of protocol data units (PDUs) in the transport block. The method may include transmitting the grouping descriptor with the transport block.

Some aspects described herein relate to a method of wireless communication performed by a receiver network node. The method may include receiving a transport block having a grouping descriptor that indicates grouping information for a plurality of PDUs in the transport block. The method may include processing the transport block based at least in part on the grouping information.

Some aspects described herein relate to an apparatus for wireless communication performed by a transmitter network node. The apparatus may include a memory and one or more processors, coupled to the memory. The one or more processors may be configured to generate a grouping descriptor, for a transport block, that indicates grouping information for a plurality of PDUs in the transport block. The one or more processors may be configured to transmit the grouping descriptor with the transport block.

Some aspects described herein relate to an apparatus for wireless communication performed by a receiver network node. The apparatus may include a memory and one or more processors, coupled to the memory. The one or more processors may be configured to receive a transport block having a grouping descriptor that indicates grouping information for a plurality of PDUs in the transport block. The one or more processors may be configured to process the transport block based at least in part on the grouping information.

Some aspects described herein relate to a non-transitory computer-readable medium that stores a set of instructions for wireless communication by a transmitter network node. The set of instructions, when executed by one or more processors of the transmitter network node, may cause the transmitter network node to generate a grouping descriptor, for a transport block, that indicates grouping information for a plurality of PDUs in the transport block. The set of instructions, when executed by one or more processors of the transmitter network node, may cause the transmitter network node to transmit the grouping descriptor with the transport block.

Some aspects described herein relate to a non-transitory computer-readable medium that stores a set of instructions for wireless communication by a receiver network node. The set of instructions, when executed by one or more processors of the receiver network node, may cause the receiver network node to receive a transport block having a grouping descriptor that indicates grouping information for a plurality of PDUs in the transport block. The set of instructions, when executed by one or more processors of the receiver network node, may cause the receiver network node to process the transport block based at least in part on the grouping information.

Some aspects described herein relate to an apparatus for wireless communication. The apparatus may include means for generating a grouping descriptor, for a transport block, that indicates grouping information for a plurality of PDUs in the transport block. The apparatus may include means for transmitting the grouping descriptor with the transport block.

Some aspects described herein relate to an apparatus for wireless communication. The apparatus may include means for receiving a transport block having a grouping descriptor that indicates grouping information for a plurality of PDUs in the transport block. The apparatus may include means for processing the transport block based at least in part on the grouping information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
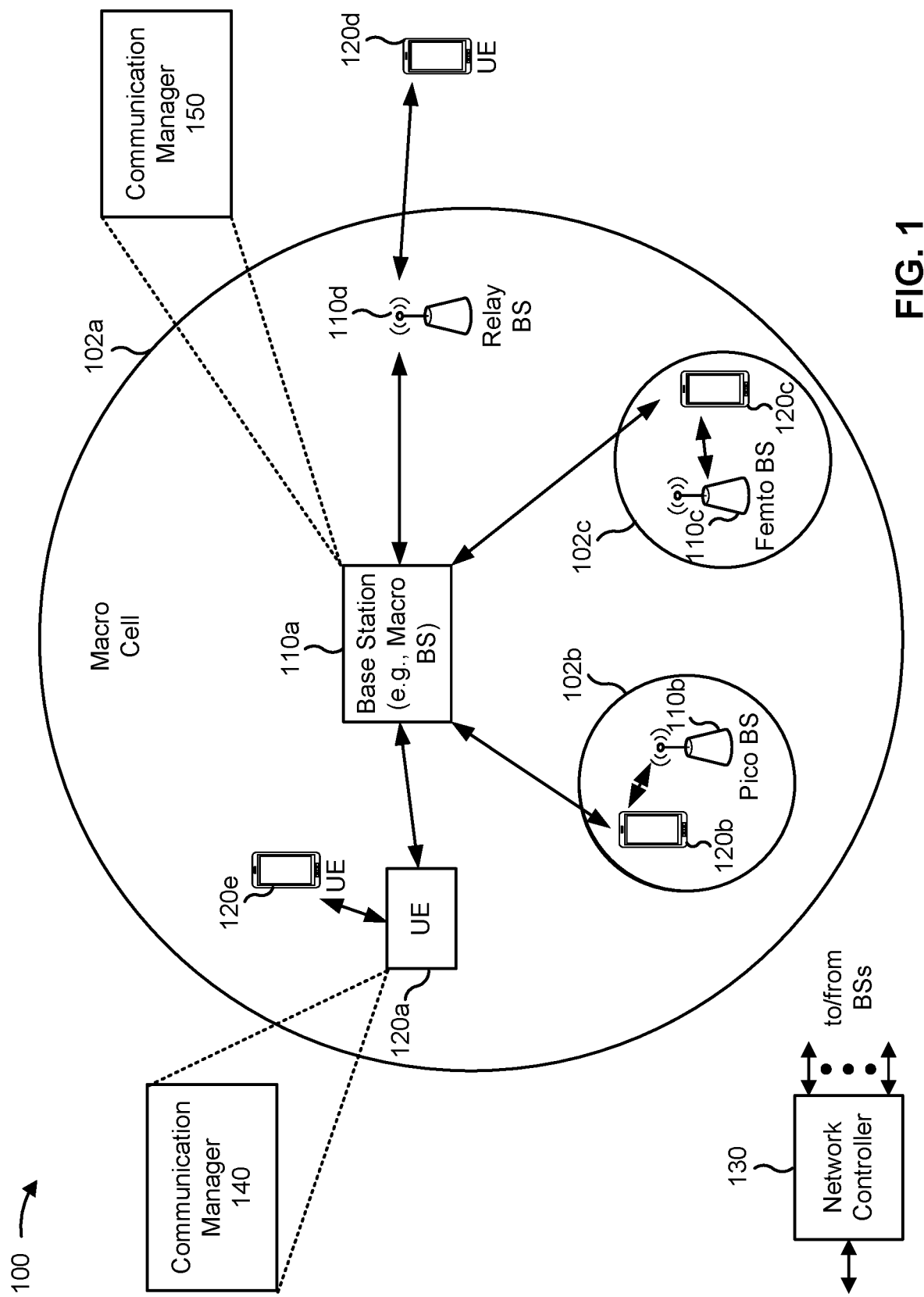
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the transmitter network node may include a communication manager 140. As described in more detail elsewhere herein, the communication manager 140 may generate a grouping descriptor, for a transport block, that indicates grouping information for a plurality of protocol data units (PDUs) in the transport block; and transmit the grouping descriptor with the transport block. Additionally, or alternatively, the communication manager 140 may perform one or more other operations described herein.

In some aspects, the receiver network node may include a communication manager 150. As described in more detail elsewhere herein, the communication manager 150 may receive a transport block having a grouping descriptor that indicates grouping information for a plurality of PDUs in the transport block; and process the transport block based at least in part on the grouping information. Additionally, or alternatively, the communication manager 150 may perform one or more other operations described herein.

As indicated above, FIG. 1 is provided as an example. Other examples may differ from what is described with regard to FIG. 1.

Figure 2:
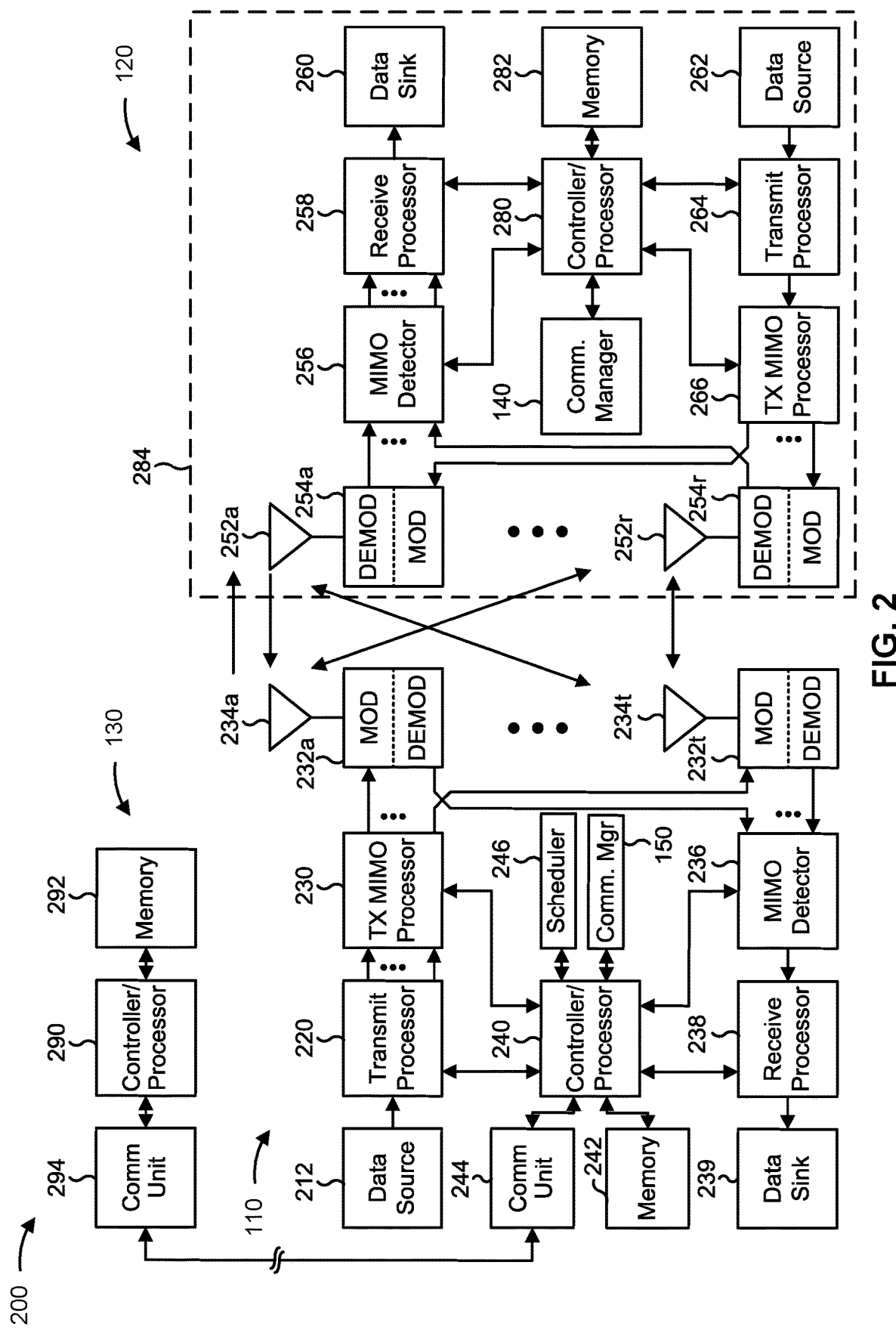
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with a transport block descriptor for packet grouping, as described in more detail elsewhere herein. In some aspects, the transmitter network node described herein is the base station 110, is included in the base station 110, or includes one or more components of the base station 110 shown in FIG. 2. In some aspects, the transmitter network node described herein is the UE 120, is included in the UE 120, or includes one or more components of the UE 120 shown in FIG. 2. In some aspects, the receiver network node described herein is the base station 110, is included in the base station 110, or includes one or more components of the base station 110 shown in FIG. 2. In some aspects, the receiver network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the transmitter network node includes means for generating a grouping descriptor, for a transport block, that indicates grouping information for a plurality of PDUs in the transport block; and/or means for transmitting the grouping descriptor with the transport block. In some aspects, the means for the transmitter network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the transmitter network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiver network node includes means for receiving a transport block having a grouping descriptor that indicates grouping information for a plurality of PDUs in the transport block; and/or means for processing the transport block based at least in part on the grouping information. In some aspects, the means for the receiver network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiver network node to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
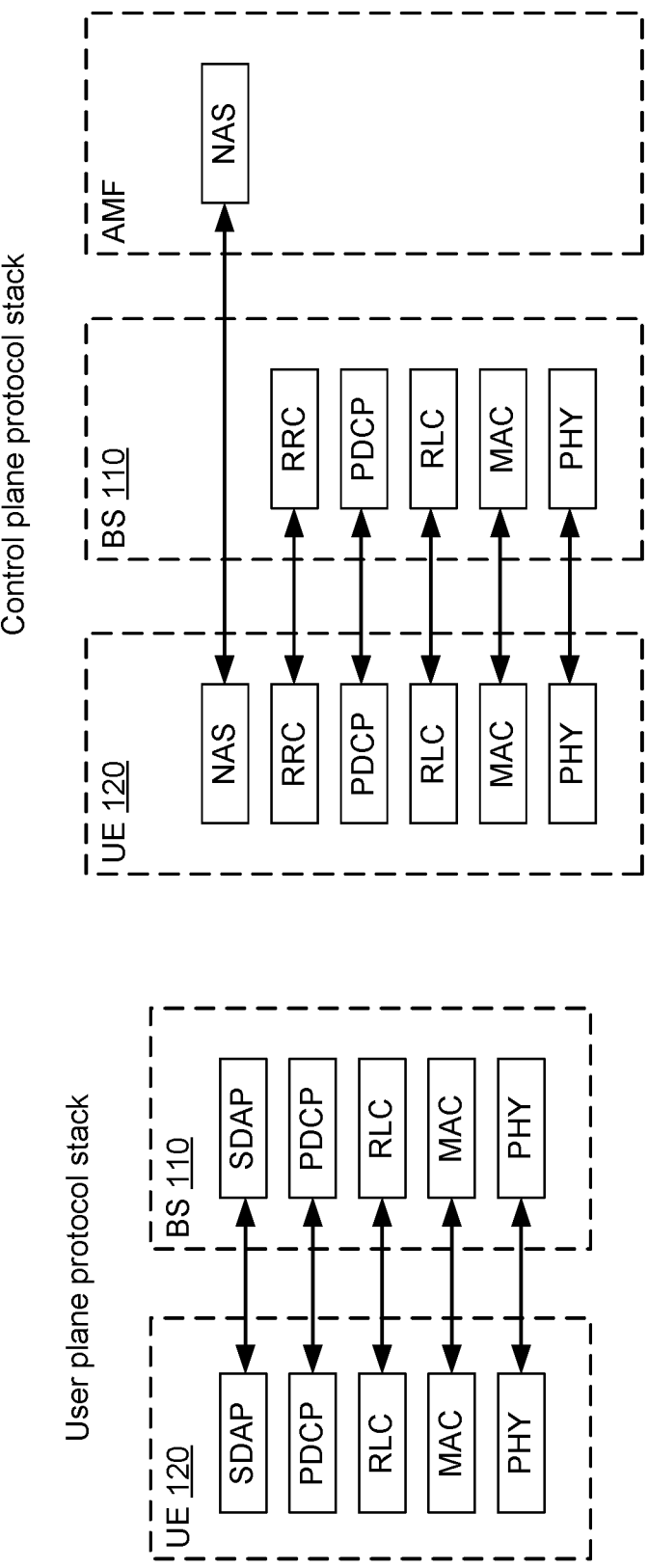
FIG. 3 is a diagram illustrating an example of a user plane protocol stack and a control plane protocol stack, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP PDU routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding. The logical channel(s) may be identified by a logical channel identifier (LCID) or an extended logical channel identifier (eLCID).

The MAC layer may package data from logical channels into transport blocks and may provide the transport blocks on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive transport blocks and may provide the transport blocks on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As described in more detail below, a transport block having a plurality of PDUs may include a grouping descriptor. The grouping descriptor may contain grouping information for at least a portion of the plurality of PDUs and may reduce processing resources and power requirements at the receiver network node.

As indicated above, FIG. 3 is provided as an example. Other examples may differ from what is described with regard to FIG. 3.

Figure 4:
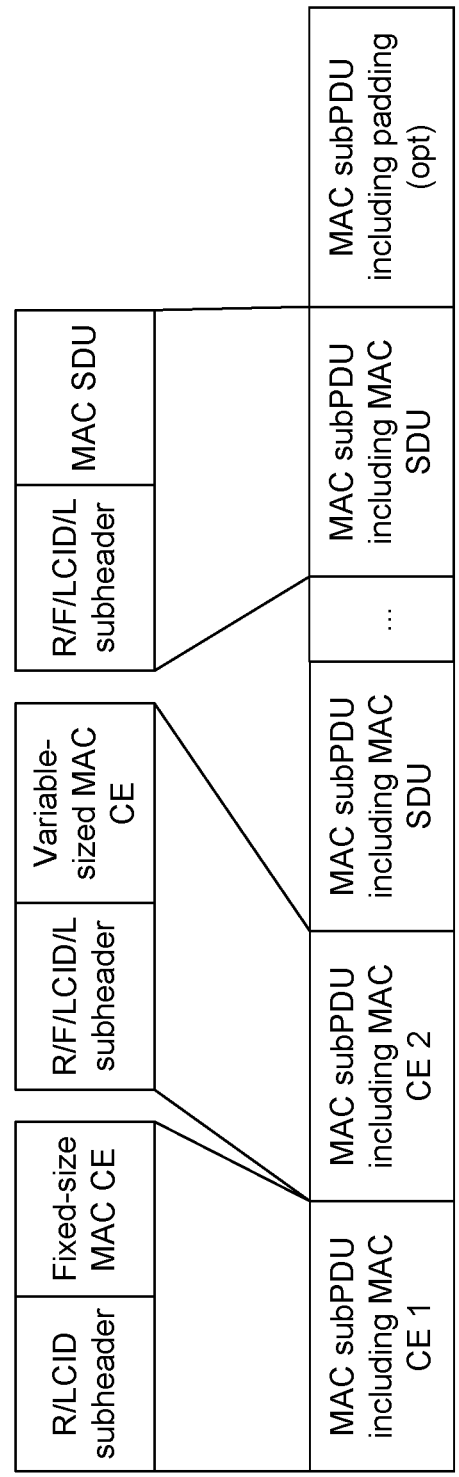
FIG. 4 is a diagram illustrating an example of a transport block, in accordance with the present disclosure.

FIG. 4 is a diagram illustrating an example 400 of a transport block, in accordance with the present disclosure. The transport block may be include one or more PDUs (e.g., MAC PDUs). In some cases, the MAC PDU may include one or more MAC subPDUs. Each MAC subPDU may include one of the following:
  a MAC subheader only (including padding);
  a MAC subheader and a MAC SDU;
  a MAC subheader and a MAC control element (CE); or
  a MAC subheader and padding.

The MAC SDUs may be of variable sizes. In some cases, each MAC subheader may correspond to a MAC SDU, a MAC CE, or padding.

In some cases, a MAC subheader (except for a fixed sized MAC CE, padding, and MAC SDU containing UL control channel) may include the header fields R/F/LCID/(eLCID)/L. Alternatively, a MAC subheader for fixed sized MAC CE, padding, and MAC SDU containing UL control channel may include the two header fields R/LCID/(eLCID).

In some cases, MAC CEs may be grouped together. In some cases, DL MAC subPDU(s) with MAC CE(s) may be placed before any MAC subPDU with MAC SDU or MAC subPDU with padding. In some cases, UL MAC subPDU(s) with MAC CE(s) may be placed after all of the MAC subPDU(s) with MAC SDU, and before the MAC subPDU with padding in the MAC PDU. In some cases, the size of the padding may be zero (e.g., there may be no padding). In some cases, a maximum of one MAC PDU may be transmitted per transport block, and per MAC entity.

In some cases, within a transport block, each PDCP SDU may be prefixed with a PDCP header, an RLC header, or a MAC header to include information used by each layer on both the transmitter side (e.g., a transmitter network node) and the receiver side (e.g., a receiver network node). In some cases, each transport block may include a large number of PDCP SDUs, depending on the transport block size. For example, for FR1 scheduling with a transport block size of 200 kilobytes, and a PDCP PDU length of 1500 bytes, a transport block received by the receiver network node may contain approximately one hundred thirty PDUs.

For each PDU that is received, the receiver network node may perform multiple functions, such as error detection, segmentation and reassembly of RLC SDUs, duplicate detection and discarding, and/or re-segmentation of RLC SDU segments. Additionally, or alternatively, the receiver network node may perform PDU reordering and duplicate discarding, and deciphering and integrity verification, when ciphering and integrity protection are enabled. L2 operations associated with traversing each PDU in the transport block may require a large amount of processing resources and power resources for the receiver network node. Thus, the PDU transmission may have a negative impact on receiver processing load and power consumption, which is not desired behavior, especially in NR and LIE peak throughput use cases.

Techniques and apparatuses are described herein for a transport block descriptor for packet grouping. In some aspects, a transmitter network node may generate one or more grouping descriptors for a transport block. The grouping descriptor may indicate grouping information for a plurality of PDUs in the transport block. For example, the grouping descriptor may include information for a plurality of PDUs having similar characteristics, such as MAC PDUs, or MAC SDUs, among other examples. The transmitter network node may transmit the grouping descriptor with the transport block to a receiver network node. For example, the transmitter network node may prepend the grouping descriptor to the transport block. The receiver network node may receive the transport block and the grouping descriptor, and the receiver network node may process the transport block based at least in part on the grouping information.

As described above, processing each PDU in the transport block may require a large number of processing resources and power resources by the receiver network node. Adding the grouping descriptor to the transport block, such as by prepending the grouping descriptor to the transport block, may decrease the number of processing resources and the power consumption by the receiver network node. For example, the receiver network node may receive the transport block having the grouping identifier, and may only need to process the grouping identifier, and not the individual PDUs themselves, for at least a portion of the PDUs in the transport block that are identified in the grouping identifier. Thus, less processing resources may be needed, and power consumption may be reduced.

As indicated above, FIG. 4 is provided as an example. Other examples may differ from what is described with regard to FIG. 4.

Figure 5:
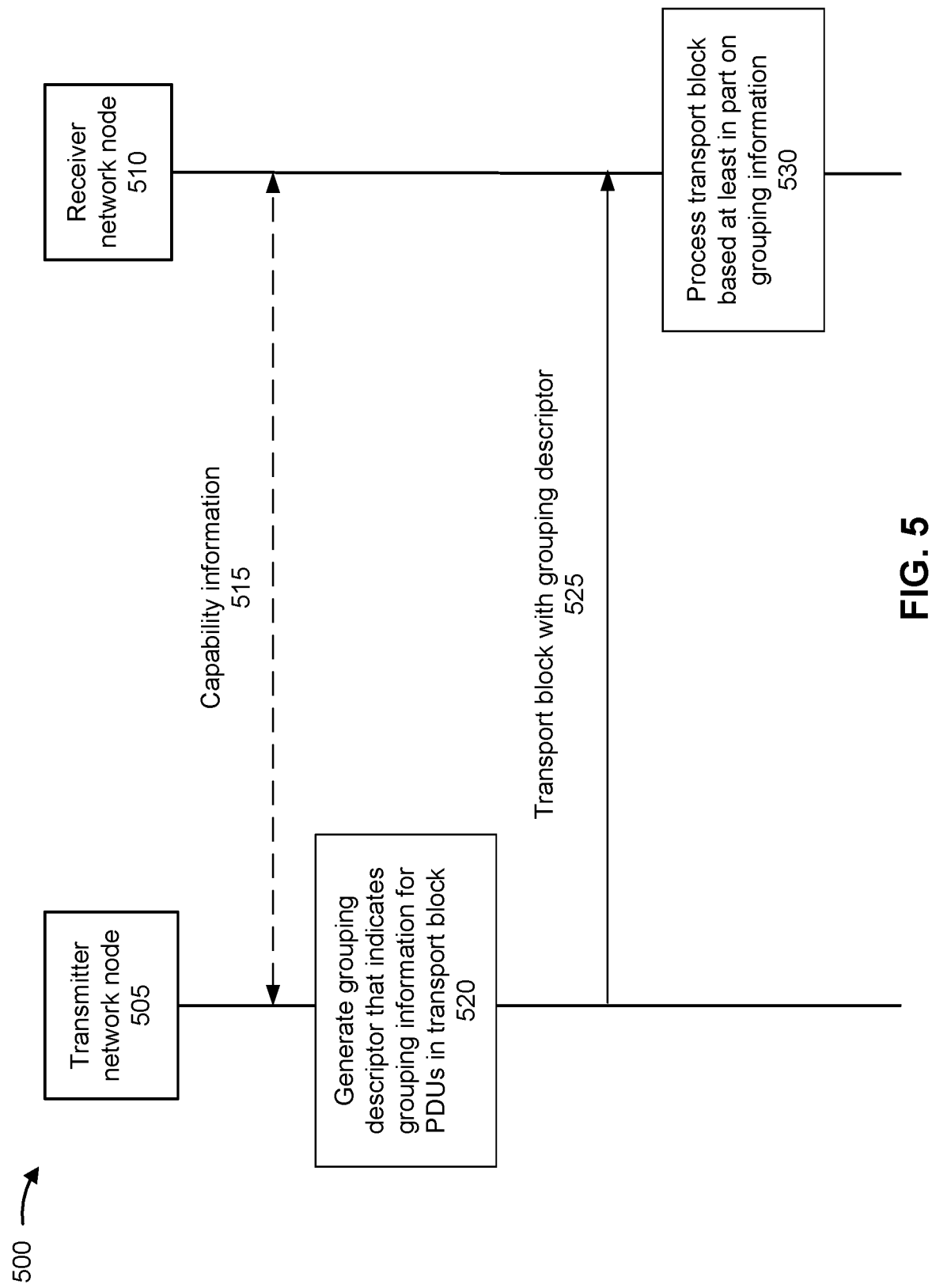
FIG. 5 is a diagram illustrating an example associated with a transport block descriptor for packet grouping, in accordance with the present disclosure.

FIG. 5 is a diagram illustrating an example 500 of a transport block descriptor for packet grouping, in accordance with the present disclosure. A transmitter network node, such as the transmitter network node 505, may communicate with a receiver network node, such as the receiver network node 510. The transmitter network node 505 may be implemented in a UE, such as the UE 120, or in a base station, such as the base station 110. Similarly, the receiver network node 510 may be implemented in a UE, such as the UE 120, or in a base station, such as the base station 110.

As shown in connection with reference number 515, the transmitter network node 505 and the receiver network node 510 may communicate capability information. The capability information may indicate whether a particular network node supports the grouping descriptor capability. For example, the transmitter network node 505 may transmit, and the receiver network node 510 may receive, an indication that the transmitter network node 505 supports the grouping descriptor capability. Additionally, or alternatively, the receiver network node 510 may transmit, and the transmitter network node 505 may receive, an indication that the receiver network node 510 supports the grouping descriptor capability.

As shown in connection with reference number 520, the transmitter network node 505 may generate a grouping descriptor that indicates grouping information for a plurality of PDUs in a transport block. The transmitter network node 505 may be configured to determine the grouping information based at least in part on one or more characteristics of the plurality of PDUs in the transport block. For example, the grouping descriptor may indicate first grouping information for a first group of PDUs having a first characteristic (e.g., MAC CE), and second grouping information for a second group of PDUs having a second characteristic (e.g., PDCP).

In some aspects, the grouping descriptor may include multiple portions. For example, the grouping descriptor may include an LCID subheader portion and a payload portion that includes grouping information that describes the transport block. The transmitter network node 505 may use an LCID value having a variable length. In some aspects, the grouping descriptor may include some or all of the following information:

the total transport block byte length covered by the grouping descriptor (if the entire transport block is parsed, this may be the entire length of the transport block);

the number of groups; and information for each group of the number of groups.

In some aspects, the grouping descriptor may apply to different PDU types. For example, one or more of the MAC CEs (e.g., all of the MAC CEs) may be aggregated into a group. Additionally, or alternatively, one or more MAC SDUs having the same logical channel (e.g., all MAC SDUs having the same logical channel) may be aggregated into a group. In some aspects, different PDU types may be split into separate groups. For example, the RLC/PDCP data PDU may be included a first group, and the control PDU may be included a second group).

In some aspects, a group may be determined based at least in part on a MAC CE, padding, control PDUs, and/or segments. For example, grouping information may be generated if the PDUs are MAC CEs.

In some aspects, a group may be determined based at least in part on one or more RLC/PDCP SDUs. For example, one or more RLC PDUs that have consecutive sequence numbers may be aggregated into a group. Additionally, or alternatively, one or more PDCP PDUs that have consecutive sequence numbers may be aggregated into a group. In some aspects, an RLC or PDCP header may contain one or more fields that indicate whether the current PDU is a data PDU or a control PDU. The sequence number (SN) field may indicate the sequence number of the current PDU. In some aspects, the receiver may use the SN to determine whether the PDU has been received or not. In some aspects, the RLC control PDU may be included a separate group than the RLC data PDU. Additionally, or alternatively, the PDCP control PDU may be included in a separate group than the PDCP data PDU.

In some aspects, the grouping descriptor may be included as part of the existing grant. For example, the grouping descriptor may be included as part of an existing physical downlink shared channel (PDSCH) grant. The PDSCH grant size may be based at least in part on the MCS, the number of resource blocks, and/or the number of layers, among other examples. The transmitter network node 505 may be configured to dynamically adjust the size of the grouping descriptor based at least in part on the grant utilization efficiency (e.g., based at least in part on the traffic pattern).

In some cases, the transmitter network node 505 may be configured to generate the grouping descriptor during a building of the transport block. Additional details associated with the grouping descriptor are provided below in connection with FIGS. 6-7.

As shown in connection with reference number 525, the transmitter network node 505 may transmit, and the receiver network node 510 may receive, the transport block with the grouping descriptor. The transmitter network node 505 may be configured to add the grouping descriptor to the transport block. In some aspects, the transmitter network node 505 may prepend the grouping descriptor to a beginning of the transport block prior to transmitting the transport block.

In some aspects, the transmitter network node 505 may determine that a size of the grouping descriptor is above a particular size (e.g., a threshold size), or that a number of groups in the grouping descriptor is above a particular number (e.g., a group number threshold). For example, the transmitter network node 505 may determine that the grouping descriptor is larger than a certain number of bytes, or that the grouping descriptor is larger a certain percentage of bytes as compared to the configured grant size. Additionally, or alternatively, the transmitter network node 505 may determine that the grouping descriptor has a large number of groups, as compared to the number of PDUs in the transport block. In some aspects, the transmitter network node 505 may generate and/or transmit a grouping descriptor that includes only a portion of the grouping information, based at least in part on determining that the grouping descriptor is too large or has too many groups. In some aspects, the transmitter network node 505 may determine not to transmit any of the grouping information and may omit the grouping descriptor entirely, based at least in part on determining that the grouping descriptor is too large or has too many groups.

As shown in connection with reference number 530, the receiver network node 510 may process the transport block based at least in part on the grouping information. In some aspects, the receiver network node 510 may be configured to process only the grouping information, contained in the grouping descriptor, for the PDUs identified in the grouping descriptor. For example, the receiver network node 510 may receive a transport block having PDUs 1, 2, 3, 4, and 5. The grouping descriptor may include grouping information for the PDUs 1, 2, and 3. For example, the grouping descriptor may indicate that the PDUs 1, 2, and 3 are MAC CEs. Thus, the receiver network node 510 may process the grouping information, contained in the grouping descriptor, for the PDUs 1, 2, and 3. The receiver network node 510 may not need to process the content of the individual PDUs 1, 2, and 3. The receiver network node 510 may determine to process only the grouping information for the PDUs 1, 2, and 3, and not to process the data of the individual PDUs 1, 2, and 3, since the information needed from those packets is included in the grouping descriptor. In contrast, since grouping information does not exist for PDUs 4 and 5, the receiver network node 510 may process the contents of PDUs 4 and 5 separately or individually. For example, PDU 4 may have ten sub-PDUs, and PDU 5 may have five sub-PDUs. The receiver network node 510 may need to process each of the ten sub-PDUs for PDU 4, and each of the five sub-PDUs for PDU 5.

As described above, processing each PDU in the transport block may require a large number of processing resources and power resources by the receiver network node. Adding the grouping descriptor to the transport block, such as by prepending the grouping descriptor to the transport block, may decrease the number of processing resources and the power consumption by the receiver network node. For example, the receiver network node may receive the transport block having the grouping identifier, and may only need to process the grouping identifier, and not the individual PDUs themselves, for at least a portion of the PDUs in the transport block that are identified in the grouping identifier. Thus, less processing resources may be needed, and power consumption may be reduced. This may be particularly true in high throughput scenarios and when the number of carriers per slot is high (e.g., for both FR1 and FR2).

As indicated above, FIG. 5 is provided as an example. Other examples may differ from what is described with regard to FIG. 5.

Figure 6:
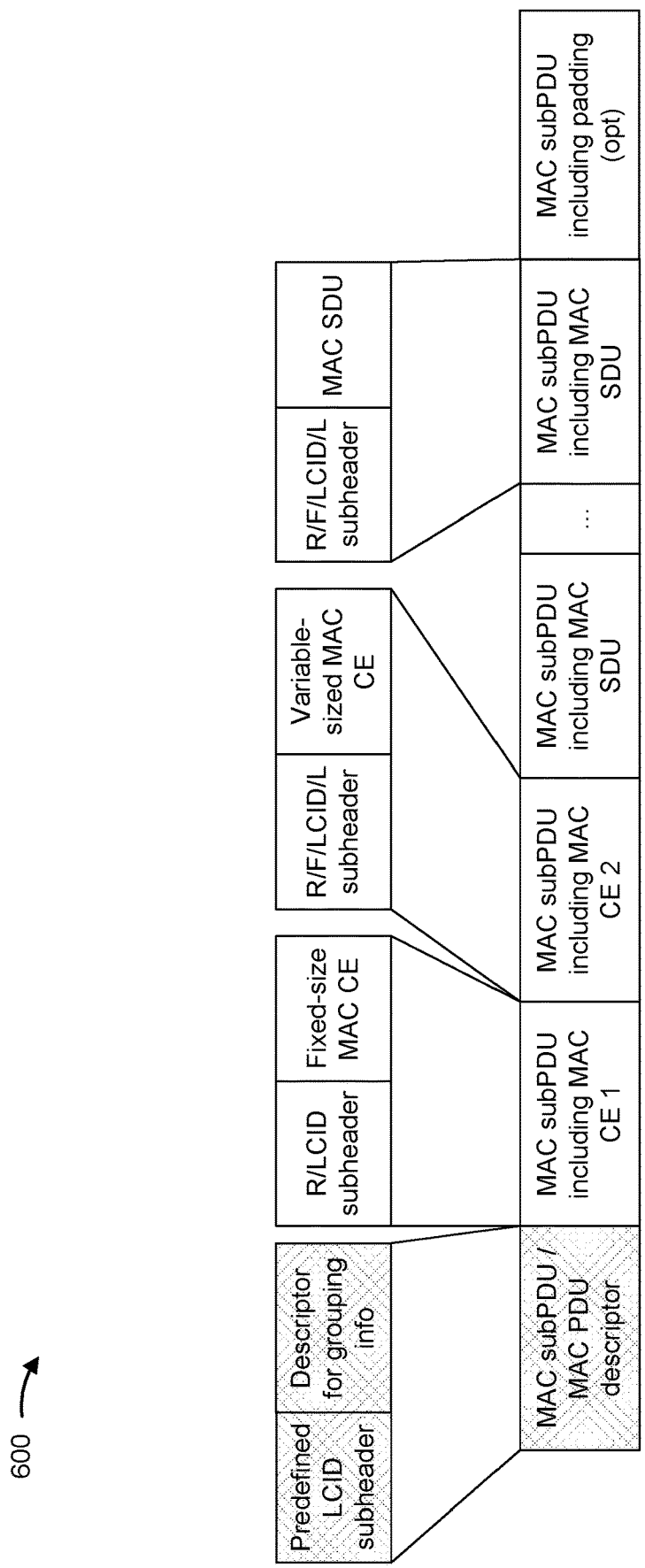
FIG. 6 is a diagram illustrating an example associated with a transport block having a grouping descriptor, in accordance with the present disclosure.

FIG. 6 is a diagram illustrating an example 600 of a transport block having a grouping descriptor, in accordance with the present disclosure.

As described above, the transmitter network node 505 may be configured to generate a grouping descriptor that includes information associated with a plurality of PDUs of a transport block. The transmitter network node 505 may prepend the grouping descriptor to the transport block and may transmit the transport block having the grouping descriptor to the receiver network node 510. The grouping descriptor may be a MAC PDU descriptor or a MAC subPDU descriptor. The grouping descriptor is shown in the example 600 as the shaded portion of the transport block.

In some cases, a portion (e.g., a first portion) of the grouping descriptor may include a header, such as an LCID subheader. The header may be a predefined header, such as a predefined LCID subheader, or any header that can be used to identify the grouping descriptor.

In some cases, a portion (e.g., a second portion) of the grouping descriptor may include the grouping information associated with one or more groups of PDUs in the transport block. For example, the grouping information may include any of the information described above in connection with FIG. 5 and/or the information described below in connection with FIG. 7.

As indicated above, FIG. 6 is provided as an example. Other examples may differ from what is described with regard to FIG. 6.

Figure 7:
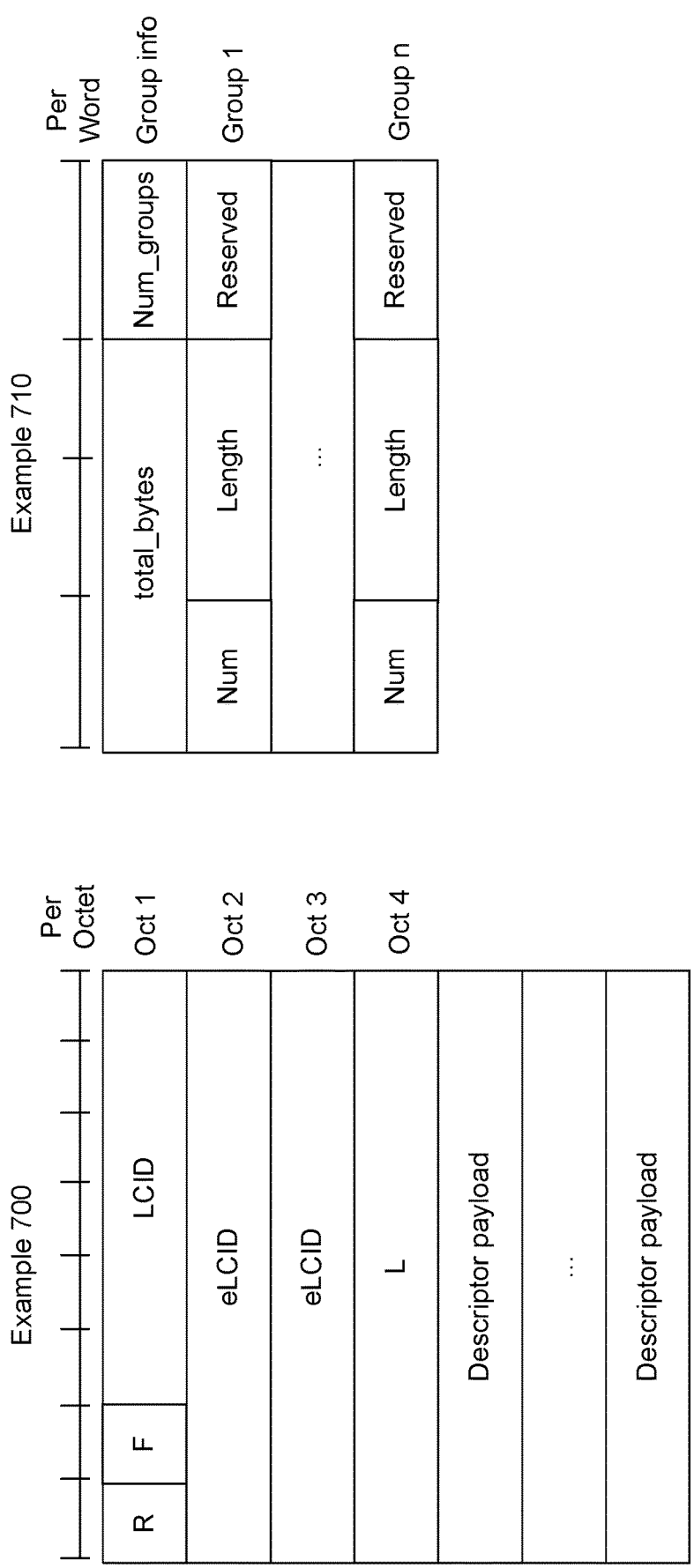
FIG. 7 is a diagram illustrating an example associated with grouping information for a grouping descriptor, in accordance with the present disclosure.

FIG. 7 is a diagram illustrating examples 700 and 710 of grouping information for a grouping descriptor, in accordance with the present disclosure.

In some cases, as shown in example 700, the grouping descriptor may include grouping information per octet, and may include one or more of the fields below:

LCID: the LCID field may identify the logical channel instance of the corresponding MAC SDU, the type of the corresponding MAC CE, or the padding. In some cases, there may be one LCID field per MAC subheader. The size of the LCID field may be 6 bits. If the LCID field is set to 34, one additional octet may be present, in the MAC subheader containing the eLCID field, that follows the octet containing LCID field. If the LCID field is set to 33, two additional octets may be present in the MAC subheader containing the eLCID field. The two additional octets may follow the octet containing the LCID field.

eLCID: the eLCID field may identify the logical channel instance of the corresponding MAC SDU, or the type of the corresponding MAC CE. The size of the eLCID field may be either 8 bits or 16 bits.

L: the length field may indicate the length of the corresponding MAC SDU or variable-sized MAC CE (e.g., in bytes). In some cases, there may be one L field per MAC subheader, except for subheaders corresponding to fixed-sized MAC CEs, padding, and MAC SDUs containing UL control channel. The size of the L field may be indicated by the F field.

F: the format field may indicate the size of the length field. There may be one F field per MAC subheader, except for subheaders corresponding to fixed-sized MAC CEs, padding, and MAC SDUs containing UL control channel. The size of the F field may be 1 bit. The value 0 may indicate 8 bits of the length field. The value 1 may indicate 16 bits of the length field.

R: the reserved bit may be initially set to zero.

Descriptor payload: the descriptor payload may include some or all of the example information shown in the table below. In some cases, the descriptor payload may include other information that is not included in the table below. The following table is provided for the purposes of an example only and is not intended to limit the information that can be included in the descriptor payload.

| Example of descriptor payload | |
|---|---|
| Descriptor length | Number of bytes occupied by the descriptor |
| Status | Status fields indicating the descriptor status (e.g., in case of error condition) |
| Total bytes | Number of total bytes of transport block contents in the descriptor. Includes entire transport block size since whole transport block is covered by the descriptor. |
| Num groups | Number of groups in the descriptor |
| Per group information | Per group information description |

In some cases, as shown in example 710, the grouping descriptor may include grouping information per group, or per word, and may include one or more of the fields below:

total_bytes: the total_bytes field indicates the total number of bytes in the grouping descriptor.

num_groups: the number of groups field indicates the number of groups in the grouping descriptor.

Num: the number field indicates a particular group of the number of groups in the grouping descriptor.

Length: the length field indicates the length of the particular group (e.g., in bytes).

The per group information may include some or all of the example information shown in the table below. In some cases, the per group information may include other information that is not included in the table. The following chart is provided for the purposes of an example only, and the chart is not intended to limit the information that can be included in the per group information.

| Example of per group information | |
|---|---|
| MAC CE | Indicates current group is MAC control element |
| RLC Control | Indicates current group is RLC control PDU |
| RLC Segment | Indicates current group is RLC segment |
| PDCP Control | Indicates current group is PDCP control PDU |
| Data | Indicates current group contains IP data |
| Num | Number of MAC subPDUs within current group |
| Length | Length of each subPDU |

As indicated above, FIG. 7 is provided as an example. Other examples may differ from what is described with regard to FIG. 7.

Figure 8:
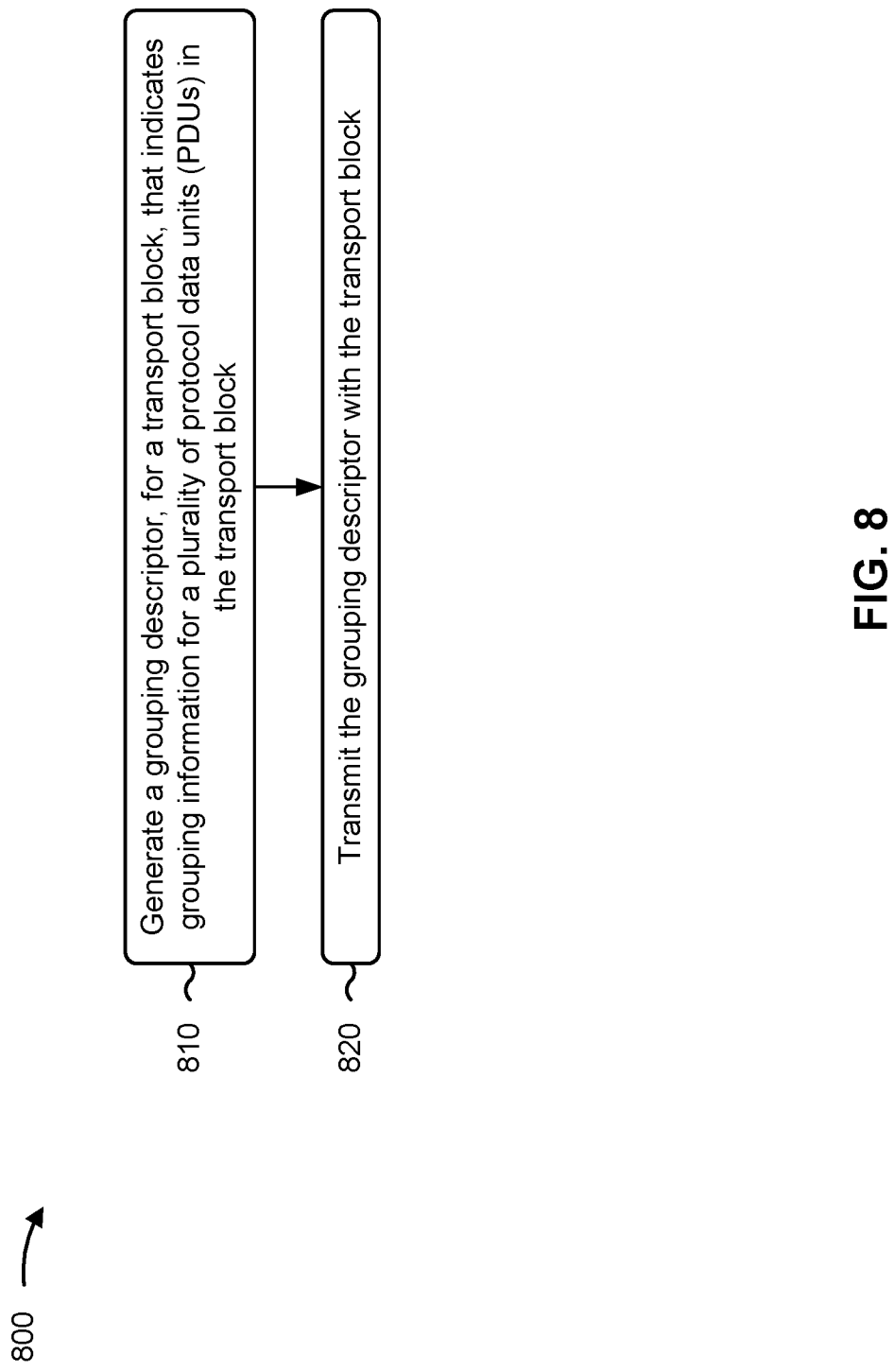
FIG. 8 is a diagram illustrating an example process associated with a transport block descriptor for packet grouping, in accordance with the present disclosure.

FIG. 8 is a diagram illustrating an example process 800 performed, for example, by a transmitter network node, in accordance with the present disclosure. Example process 800 is an example where the transmitter network node (e.g., transmitter network node 505) performs operations associated with a transport block descriptor for packet grouping.

As shown in FIG. 8, in some aspects, process 800 may include generating a grouping descriptor, for a transport block, that indicates grouping information for a plurality of PDUs in the transport block (block 810). For example, the transmitter network node (e.g., using communication manager 140 and/or generation component 1008, depicted in FIG. 10) may generate a grouping descriptor, for a transport block, that indicates grouping information for a plurality of PDUs in the transport block, as described above.

As further shown in FIG. 8, in some aspects, process 800 may include transmitting the grouping descriptor with the transport block (block 820). For example, the transmitter network node (e.g., using communication manager 140 and/or transmission component 1004, depicted in FIG. 10) may transmit the grouping descriptor with the transport block, as described above.

Process 800 may include additional aspects, such as any single aspect or any combination of aspects described below and/or in connection with one or more other processes described elsewhere herein.

In a first aspect, process 800 includes determining the grouping information based at least in part on one or more characteristics of the plurality of PDUs in the transport block.

In a second aspect, alone or in combination with the first aspect, the grouping descriptor indicates first grouping information for a first group of PDUs having a first characteristic, and second grouping information for a second group of PDUs having a second characteristic.

In a third aspect, alone or in combination with one or more of the first and second aspects, process 800 includes adding the grouping descriptor to the transport block prior to transmitting the transport block.

In a fourth aspect, alone or in combination with one or more of the first through third aspects, process 800 includes prepending the grouping descriptor to a beginning of the transport block.

In a fifth aspect, alone or in combination with one or more of the first through fourth aspects, generating the grouping descriptor comprises generating the grouping descriptor based at least in part on building the transport block.

In a sixth aspect, alone or in combination with one or more of the first through fifth aspects, process 800 includes receiving capability information indicating whether a receiver network node supports a grouping descriptor capability.

In a seventh aspect, alone or in combination with one or more of the first through sixth aspects, the grouping descriptor indicates whether a group includes MAC CE PDUs, radio link control PDUs, packet data convergence protocol PDUs, AM messages, or UM messages.

In an eighth aspect, alone or in combination with one or more of the first through seventh aspects, the grouping descriptor indicates a length of a group of PDUs, a number of groups of PDUs included in the transport block, and information for each of the groups of PDUs in the transport block.

In a ninth aspect, alone or in combination with one or more of the first through eighth aspects, the grouping descriptor includes a LCID portion and a payload portion.

In a tenth aspect, alone or in combination with one or more of the first through ninth aspects, the LCID portion includes a predefined LCID, and the payload portion includes the grouping information for one or more groups of PDUs in the transport block.

In an eleventh aspect, alone or in combination with one or more of the first through tenth aspects, the grouping descriptor is included in a grant size for the transport block.

In a twelfth aspect, alone or in combination with one or more of the first through eleventh aspects, process 800 includes determining that a size of the grouping descriptor is above a size threshold, or that a number of groups in the grouping descriptor is above a group number threshold, wherein transmitting the grouping descriptor comprises transmitting a grouping descriptor having only a portion of the grouping information, or none of the grouping information.

In a thirteenth aspect, alone or in combination with one or more of the first through twelfth aspects, the grouping descriptor includes grouping information for only a portion of the PDUs, of the plurality of PDUs, in the transport block.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
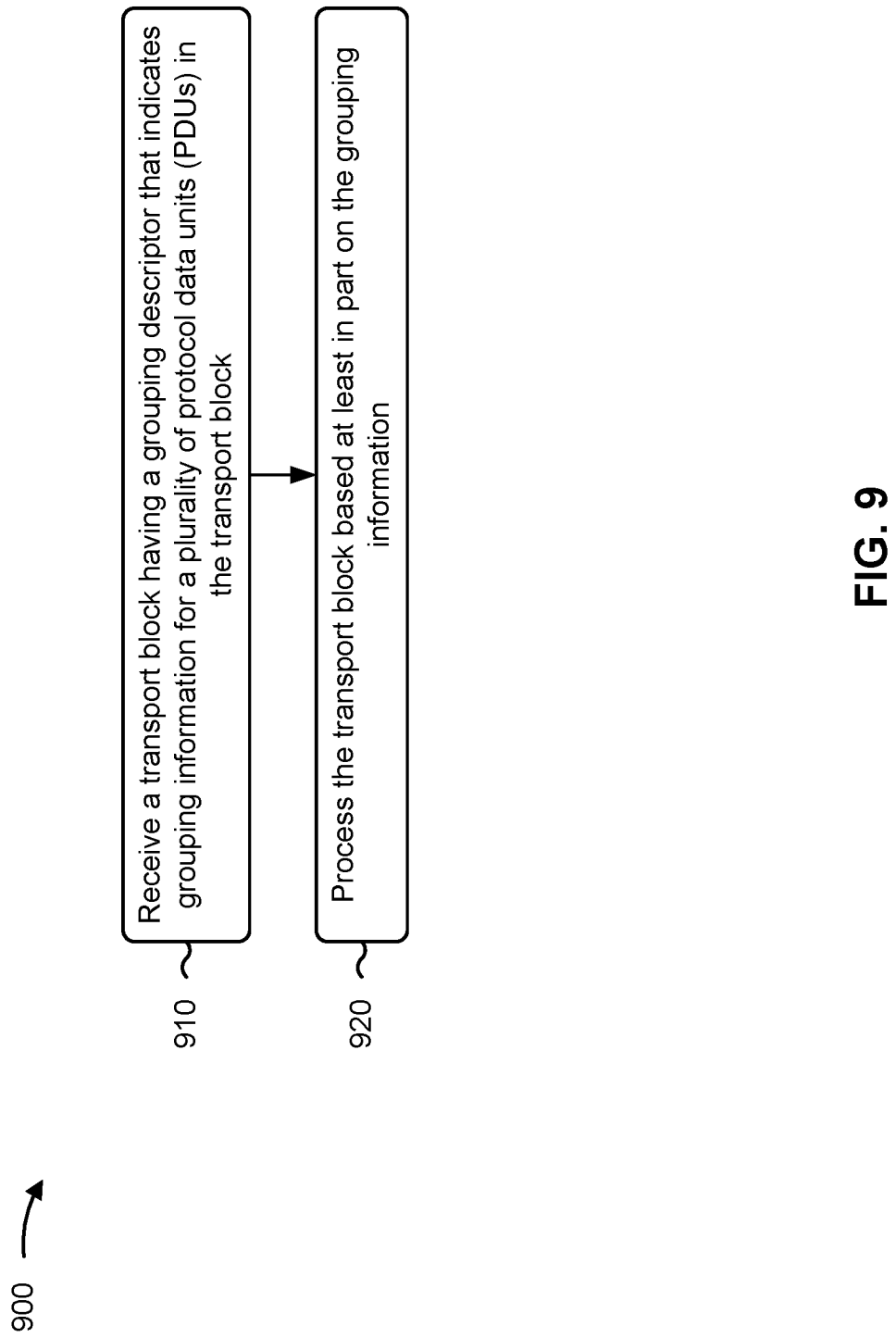
FIG. 9 is a diagram illustrating an example process associated with a transport block descriptor for packet grouping, in accordance with the present disclosure.

FIG. 9 is a diagram illustrating an example process 900 performed, for example, by a receiver network node, in accordance with the present disclosure. Example process 900 is an example where the receiver network node (e.g., receiver network node 510) performs operations associated with a transport block descriptor for packet grouping.

As shown in FIG. 9, in some aspects, process 900 may include receiving a transport block having a grouping descriptor that indicates grouping information for a plurality of PDUs in the transport block (block 910). For example, the receiver network node (e.g., using communication manager 150 and/or reception component 1102, depicted in FIG. 11) may receive a transport block having a grouping descriptor that indicates grouping information for a plurality of PDUs in the transport block, as described above.

As further shown in FIG. 9, in some aspects, process 900 may include processing the transport block based at least in part on the grouping information (block 920). For example, the receiver network node (e.g., using communication manager 150 and/or processing component 1108, depicted in FIG. 11) may process the transport block based at least in part on the grouping information, as described above.

Process 900 may include additional aspects, such as any single aspect or any combination of aspects described below and/or in connection with one or more other processes described elsewhere herein.

In a first aspect, processing the transport block based at least in part on the grouping information includes processing only the grouping information, and not the PDUs, for the PDUs identified in the grouping descriptor.

In a second aspect, alone or in combination with the first aspect, the grouping descriptor indicates first grouping information for a first group of PDUs having a first characteristic, and second grouping information for a second group of PDUs having a second characteristic.

In a third aspect, alone or in combination with one or more of the first and second aspects, the grouping descriptor is prepended to a beginning of the transport block.

In a fourth aspect, alone or in combination with one or more of the first through third aspects, process 900 includes transmitting capability information indicating whether the receiver network node supports a grouping descriptor capability.

In a fifth aspect, alone or in combination with one or more of the first through fourth aspects, the grouping descriptor indicates whether a group includes MAC CE PDUs, radio link control PDUs, packet data convergence protocol PDUs, AM messages, or UM messages.

In a sixth aspect, alone or in combination with one or more of the first through fifth aspects, the grouping descriptor indicates a length of a group of PDUs, a number of groups of PDUs included in the transport block, and information for each of the groups of PDUs in the transport block.

In a seventh aspect, alone or in combination with one or more of the first through sixth aspects, the grouping descriptor includes a LCID portion and a payload portion.

In an eighth aspect, alone or in combination with one or more of the first through seventh aspects, the LCID portion includes a predefined LCID, and the payload portion includes the grouping information for one or more groups of PDUs in the transport block.

In a ninth aspect, alone or in combination with one or more of the first through eighth aspects, the grouping descriptor is included in a grant size for the transport block.

In a tenth aspect, alone or in combination with one or more of the first through ninth aspects, the grouping descriptor includes grouping information for only a portion of the PDUs, of the plurality of PDUs, in the transport block.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
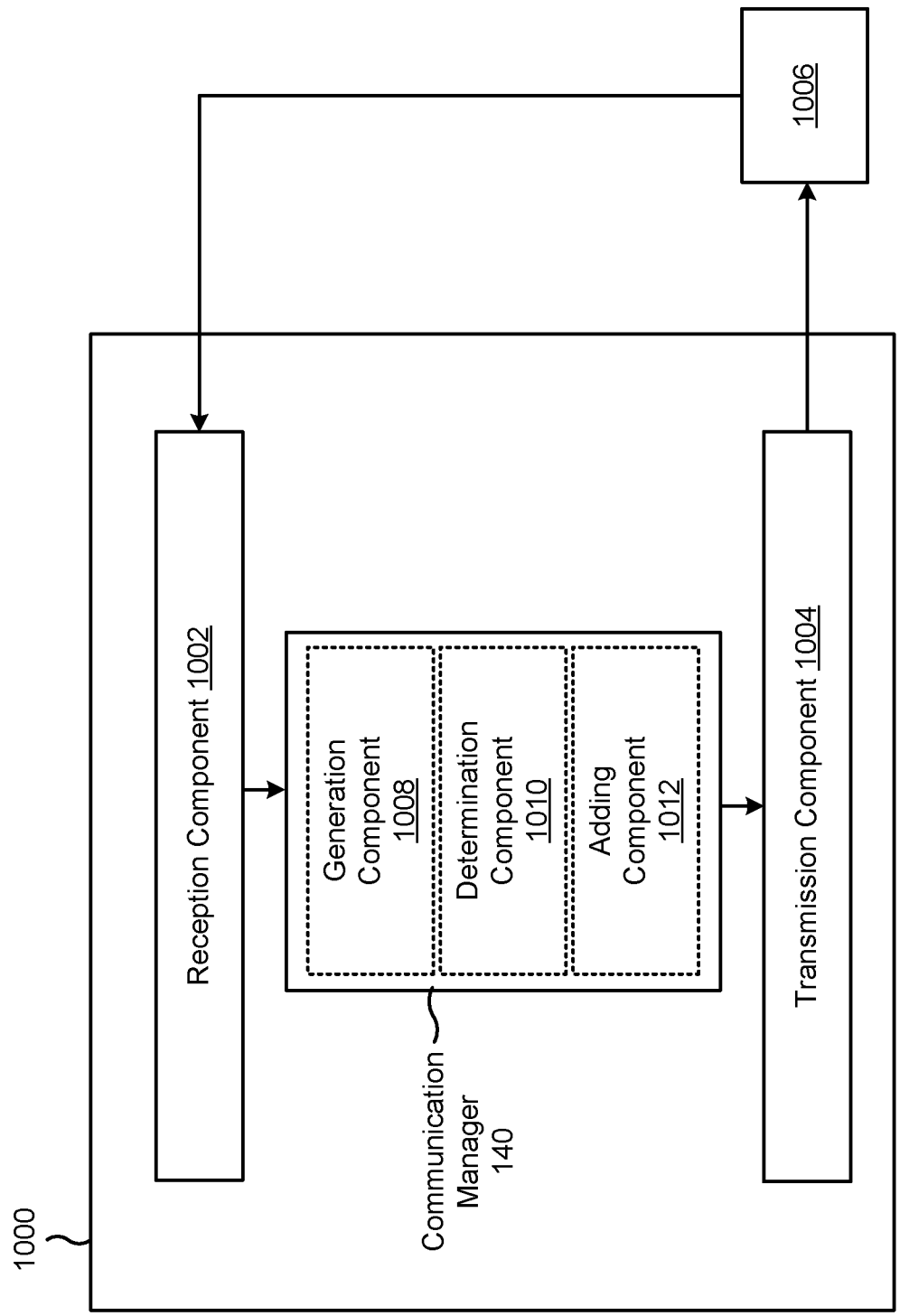
FIG. 10 is a diagram of an example apparatus for wireless communication, in accordance with the present disclosure.

FIG. 10 is a diagram of an example apparatus 1000 for wireless communication. The apparatus 1000 may be a transmitter network node, or a transmitter network node may include the apparatus 1000. The transmitter network node may be implemented as a UE, such as the UE 120, or as a base station, such as the base station 110. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a generation component 1008, a determination component 1010, or an adding component 1012, among other examples.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the transmitter network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the transmitter network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the transmitter network node described in connection with FIG. 2. In some aspects, the transmission component 1004 may be co-located with the reception component 1002 in a transceiver.

The generation component 1008 may generate a grouping descriptor, for a transport block, that indicates grouping information for a plurality of PDUs in the transport block. The transmission component 1004 may transmit the grouping descriptor with the transport block.

The determination component 1010 may determine the grouping information based at least in part on one or more characteristics of the plurality of PDUs in the transport block.

The adding component 1012 may add the grouping descriptor to the transport block prior to transmitting the transport block.

The adding component 1012 may prepend the grouping descriptor to a beginning of the transport block.

The reception component 1002 may receive capability information indicating whether a receiver network node supports a grouping descriptor capability.

The determination component 1010 may determine that a size of the grouping descriptor is above a size threshold, or that a number of groups in the grouping descriptor is above a group number threshold, wherein transmitting the grouping descriptor comprises transmitting a grouping descriptor having only a portion of the grouping information, or none of the grouping information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
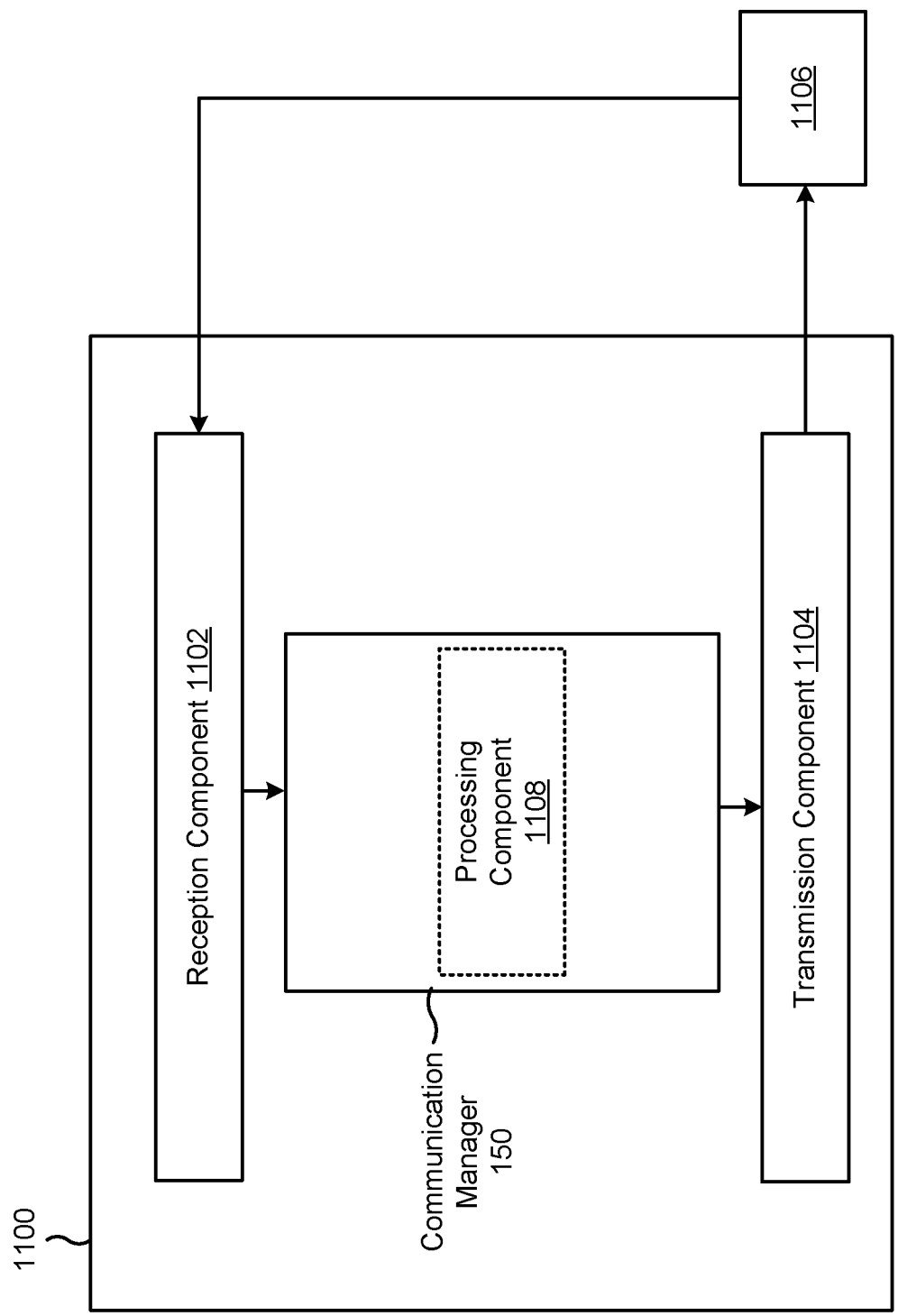
FIG. 11 is a diagram of an example apparatus for wireless communication, in accordance with the present disclosure.

FIG. 11 is a diagram of an example apparatus 1100 for wireless communication. The apparatus 1100 may be a receiver network node, or a receiver network node may include the apparatus 1100. The receiver network node may be implemented as a UE, such as the UE 120, or as a base station, such as the base station 110. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a processing component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the receiver network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the receiver network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the receiver network node described in connection with FIG. 2. In some aspects, the transmission component 1104 may be co-located with the reception component 1102 in a transceiver.

The reception component 1102 may receive a transport block having a grouping descriptor that indicates grouping information for a plurality of PDUs in the transport block. The processing component 1108 may process the transport block based at least in part on the grouping information.

The transmission component 1104 may transmit capability information indicating whether the receiver network node supports a grouping descriptor capability.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter network node, comprising: generating a grouping descriptor, for a transport block, that indicates grouping information for a plurality of protocol data units (PDUs) in the transport block; and transmitting the grouping descriptor with the transport block.

Aspect 2: The method of Aspect 1, further comprising determining the grouping information based at least in part on one or more characteristics of the plurality of PDUs in the transport block.

Aspect 3: The method of any of Aspects 1-2, wherein the grouping descriptor indicates first grouping information for a first group of PDUs having a first characteristic, and second grouping information for a second group of PDUs having a second characteristic.

Aspect 4: The method of any of Aspects 1-3, further comprising adding the grouping descriptor to the transport block prior to transmitting the transport block.

Aspect 5: The method of any of Aspects 1-4, further comprising prepending the grouping descriptor to a beginning of the transport block.

Aspect 6: The method of any of Aspects 1-5, wherein generating the grouping descriptor comprises generating the grouping descriptor based at least in part on building the transport block.

Aspect 7: The method of any of Aspects 1-6, further comprising receiving capability information indicating whether a receiver network node supports a grouping descriptor capability.

Aspect 8: The method of any of Aspects 1-7, wherein the grouping descriptor indicates whether a group includes medium access control (MAC) control element PDUs, radio link control PDUs, packet data convergence protocol PDUs, acknowledgement mode (AM) messages, or unacknowledgement mode (UM) messages.

Aspect 9: The method of any of Aspects 1-8, wherein the grouping descriptor indicates a length of a group of PDUs, a number of groups of PDUs included in the transport block, and information for each of the groups of PDUs in the transport block.

Aspect 10: The method of any of Aspects 1-9, wherein the grouping descriptor includes a logical channel identifier (LCID) portion and a payload portion.

Aspect 11: The method of Aspect 10, wherein the LCID portion includes a predefined LCID, and the payload portion includes the grouping information for one or more groups of PDUs in the transport block.

Aspect 12: The method of any of Aspects 1-11, wherein the grouping descriptor is included in a grant size for the transport block.

Aspect 13: The method of any of Aspects 1-12, further comprising determining that a size of the grouping descriptor is above a size threshold, or that a number of groups in the grouping descriptor is above a group number threshold, wherein transmitting the grouping descriptor comprises transmitting a grouping descriptor having only a portion of the grouping information, or none of the grouping information.

Aspect 14: The method of any of Aspects 1-13, wherein the grouping descriptor includes grouping information for only a portion of the PDUs, of the plurality of PDUs, in the transport block.

Aspect 15: A method of wireless communication performed by a receiver network node, comprising: receiving a transport block having a grouping descriptor that indicates grouping information for a plurality of protocol data units (PDUs) in the transport block; and processing the transport block based at least in part on the grouping information.

Aspect 16: The method of Aspect 15, wherein processing the transport block based at least in part on the grouping information includes processing only the grouping information, and not the PDUs, for the PDUs identified in the grouping descriptor.

Aspect 17: The method of any of Aspects 15-16, wherein the grouping descriptor indicates first grouping information for a first group of PDUs having a first characteristic, and second grouping information for a second group of PDUs having a second characteristic.

Aspect 18: The method of any of Aspects 15-17, wherein the grouping descriptor is prepended to a beginning of the transport block.

Aspect 19: The method of any of Aspects 15-18, further comprising transmitting capability information indicating whether the receiver network node supports a grouping descriptor capability.

Aspect 20: The method of any of Aspects 15-19, wherein the grouping descriptor indicates whether a group includes medium access control (MAC) control element PDUs, radio link control PDUs, packet data convergence protocol PDUs, acknowledgement mode (AM) messages, or unacknowledgement mode (UM) messages.

Aspect 21: The method of any of Aspects 15-20, wherein the grouping descriptor indicates a length of a group of PDUs, a number of groups of PDUs included in the transport block, and information for each of the groups of PDUs in the transport block.

Aspect 22: The method of any of Aspects 15-21, wherein the grouping descriptor includes a logical channel identifier (LCID) portion and a payload portion.

Aspect 23: The method of Aspect 22, wherein the LCID portion includes a predefined LCID, and the payload portion includes the grouping information for one or more groups of PDUs in the transport block.

Aspect 24: The method of any of Aspects 15-23, wherein the grouping descriptor is included in a grant size for the transport block.

Aspect 25: The method of any of Aspects 15-24, wherein the grouping descriptor includes grouping information for only a portion of the PDUs, of the plurality of PDUs, in the transport block.

Aspect 26: An apparatus for wireless communication at a device, comprising a processor; memory coupled with the processor; and instructions stored in the memory and executable by the processor to cause the apparatus to perform the method of one or more of Aspects 1-14.

Aspect 27: A device for wireless communication, comprising a memory and one or more processors coupled to the memory, the one or more processors configured to perform the method of one or more of Aspects 1-14.

Aspect 28: An apparatus for wireless communication, comprising at least one means for performing the method of one or more of Aspects 1-14.

Aspect 29: A non-transitory computer-readable medium storing code for wireless communication, the code comprising instructions executable by a processor to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 1-14.

Aspect 31: An apparatus for wireless communication at a device, comprising a processor; memory coupled with the processor; and instructions stored in the memory and executable by the processor to cause the apparatus to perform the method of one or more of Aspects 15-25.

Aspect 32: A device for wireless communication, comprising a memory and one or more processors coupled to the memory, the one or more processors configured to perform the method of one or more of Aspects 15-25.

Aspect 33: An apparatus for wireless communication, comprising at least one means for performing the method of one or more of Aspects 15-25.

Aspect 34: A non-transitory computer-readable medium storing code for wireless communication, the code comprising instructions executable by a processor to perform the method of one or more of Aspects 15-25.

Aspect 35: A non-transitory computer-readable medium storing a set of instructions for wireless communication, the set of instructions comprising one or more instructions that, when executed by one or more processors of a device, cause the device to perform the method of one or more of Aspects 15-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a transmitter network node, comprising:
   one or more memories; and
   one or more processors, coupled to the one or more memories, configured to:
   generate a grouping descriptor, for a transport block, that indicates grouping information for a plurality of protocol data units (PDUs) in the transport block, wherein the grouping descriptor indicates first grouping information for a first group of PDUs having a first characteristic, and second grouping information for a second group of PDUs having a second characteristic, and
   wherein the grouping descriptor comprises a logical channel identifier (LCID) portion and a payload portion, wherein the payload portion comprises the grouping information; and
   transmit the grouping descriptor with the transport block.

2. The apparatus of claim 1, wherein the one or more processors are further configured to determine the grouping information based at least in part on one or more characteristics, comprising the first characteristic and the second characteristic, of the plurality of PDUs in the transport block.

3. The apparatus of claim 1, wherein the one or more processors are further configured to add the grouping descriptor to the transport block prior to transmitting the transport block.

4. The apparatus of claim 1, wherein the one or more processors are further configured to prepend the grouping descriptor to a beginning of the transport block.

5. The apparatus of claim 1, wherein the one or more processors, to generate the grouping descriptor, are configured to generate the grouping descriptor based at least in part on building the transport block.

6. The apparatus of claim 1, wherein the one or more processors are further configured to receive capability information indicating whether a receiver network node supports a grouping descriptor capability.

7. The apparatus of claim 1, wherein the grouping descriptor indicates whether a group includes medium access control (MAC) control element PDUs, radio link control PDUs, packet data convergence protocol PDUs, acknowledgement mode (AM) messages, or unacknowledgement mode (UM) messages.

8. The apparatus of claim 1, wherein the grouping descriptor indicates a length of a group of PDUs, a number of groups of PDUs included in the transport block, and information for each of the groups of PDUs in the transport block.

9. The apparatus of claim 1, wherein the grouping descriptor is included in a grant size for the transport block.

10. The apparatus of claim 1, wherein the first characteristic comprises an association with medium access control (MAC) PDUs and the second characteristic comprises an association with MAC service data units (SDUs).

11. The apparatus of claim 1, wherein the first characteristic comprises an association with medium access control control elements (MAC-CEs) and the second characteristic comprises an association with packet data convergence protocol (PDCP).

12. The apparatus of claim 1, wherein the first characteristic comprises an association with a radio link control (RLC) packet data convergence protocol (PDCP) data PDU and the second characteristic comprises an association with a control PDU.

13. An apparatus for wireless communication at a receiver network node, comprising:
one or more memories; and
one or more processors, coupled to the one or more memories, configured to:
receive a transport block having a grouping descriptor that indicates grouping information for a plurality of protocol data units (PDUs) in the transport block, wherein the grouping descriptor indicates first grouping information for a first group of PDUs having a first characteristic, and second grouping information for a second group of PDUs having a second characteristic, and
wherein the grouping descriptor comprises a logical channel identifier (LCID) portion and a payload portion, wherein the payload portion comprises the grouping information; and
process the transport block based at least in part on the grouping information.

14. The apparatus of claim 13, wherein the one or more processors, to process the transport block based at least in part on the grouping information, are configured to process only the grouping information, and not the PDUs, for the PDUs identified in the grouping descriptor.

15. The apparatus of claim 13, wherein the grouping descriptor is prepended to a beginning of the transport block.

16. The apparatus of claim 13, wherein the one or more processors are further configured to transmit capability information indicating whether the receiver network node supports a grouping descriptor capability.

17. The apparatus of claim 13, wherein the grouping descriptor indicates whether a group includes medium access control (MAC) control element PDUs, radio link control PDUs, packet data convergence protocol PDUs, acknowledgement mode (AM) messages, or unacknowledgement mode (UM) messages.

18. The apparatus of claim 13, wherein the grouping descriptor indicates a length of a group of PDUs, a number of groups of PDUs included in the transport block, and information for each of the groups of PDUs in the transport block.

19. The apparatus of claim 13, wherein the grouping descriptor is included in a grant size for the transport block.

20. A method of wireless communication performed by a transmitter network node, comprising:
generating a grouping descriptor, for a transport block, that indicates grouping information for a plurality of protocol data units (PDUs) in the transport block, wherein the grouping descriptor indicates first grouping information for a first group of PDUs having a first characteristic, and second grouping information for a second group of PDUs having a second characteristic, and
wherein the grouping descriptor comprises a logical channel identifier (LCID) portion and a payload portion, wherein the payload portion comprises the grouping information; and
transmitting the grouping descriptor with the transport block.

21. The method of claim 20, further comprising determining the grouping information based at least in part on one or more characteristics, comprising the first characteristic and the second characteristic, of the plurality of PDUs in the transport block.

22. The method of claim 20, further comprising prepending the grouping descriptor to a beginning of the transport block.

23. The method of claim 20, further comprising receiving capability information indicating whether a receiver network node supports a grouping descriptor capability.

24. The method of claim 20, wherein the grouping descriptor includes a logical channel identifier (LCID) portion and a payload portion.

25. The method of claim 20, wherein the grouping descriptor indicates whether a group includes medium access control (MAC) control element PDUs, radio link control PDUs, packet data convergence protocol PDUs, acknowledgement mode (AM) messages, or unacknowledgement mode (UM) messages.

26. The method of claim 20, wherein the grouping descriptor indicates a length of a group of PDUs, a number of groups of PDUs included in the transport block, and information for each of the groups of PDUs in the transport block.

27. A method of wireless communication performed by a receiver network node, comprising:
receiving a transport block having a grouping descriptor that indicates grouping information for a plurality of protocol data units (PDUs) in the transport block, wherein the grouping descriptor indicates first grouping information for a first group of PDUs having a first characteristic, and second grouping information for a second group of PDUs having a second characteristic, and
wherein the grouping descriptor comprises a logical channel identifier (LCID) portion and a payload portion, wherein the payload portion comprises the grouping information; and
processing the transport block based at least in part on the grouping information.

28. The method of claim 27, wherein processing the transport block based at least in part on the grouping information includes processing only the grouping information, and not the PDUs, for the PDUs identified in the grouping descriptor.

29. The method of claim 27, wherein the grouping descriptor is prepended to a beginning of the transport block.

30. The method of claim 27, further comprising transmitting capability information indicating whether the receiver network node supports a grouping descriptor capability.

* * * * *